Dec. 24, 1968   P. C. RUFFLES ET AL   3,417,944
VERTICAL TAKE-OFF AIRCRAFT
Filed Feb. 23, 1967   3 Sheets-Sheet 1
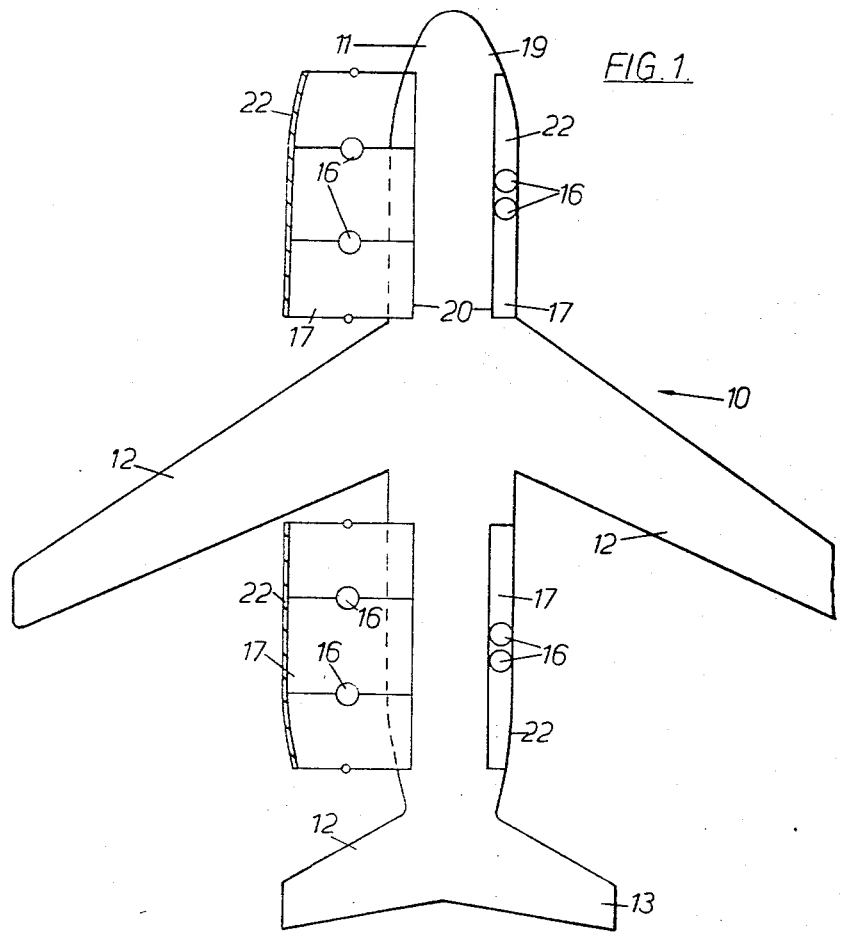
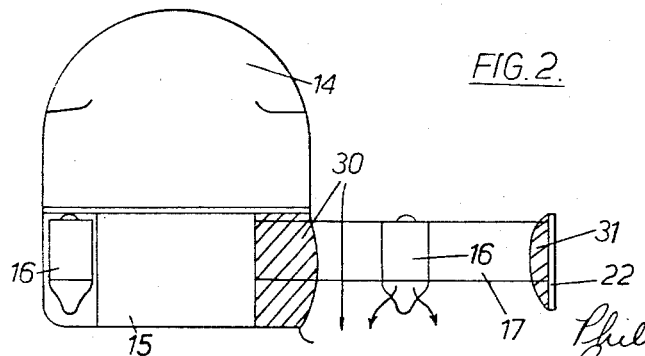
Inventors
Philip Charles Ruffles
Paul Alfred Taylor
By
Cushman, Darby, Cushman
Attorneys

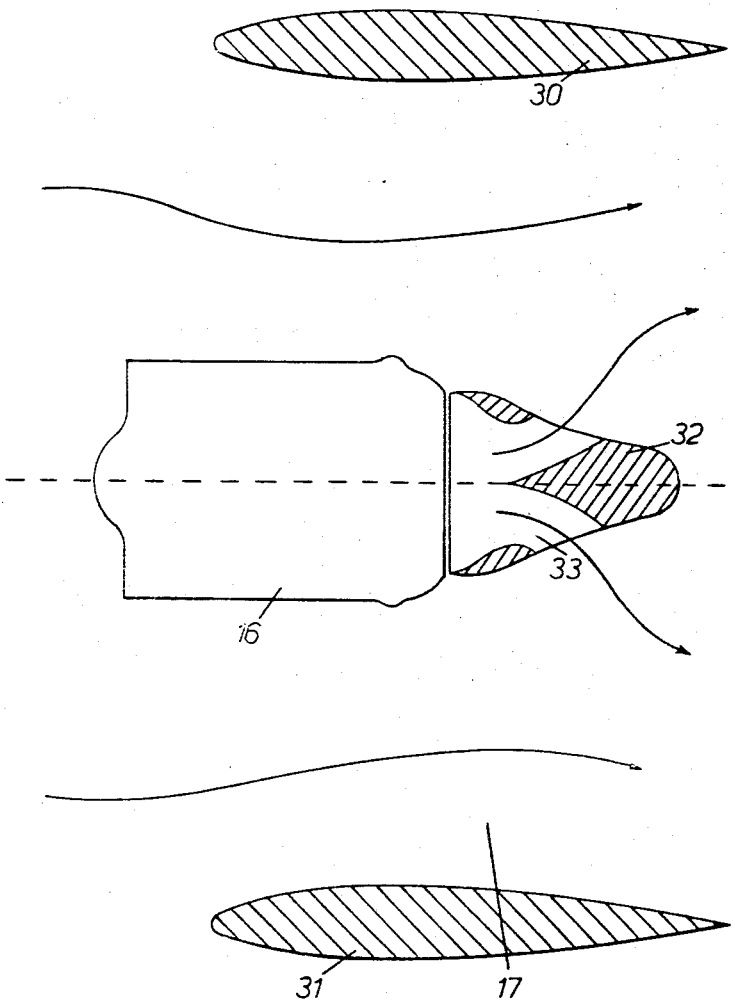

United States Patent Office 3,417,944
Patented Dec. 24, 1968

3,417,944
VERTICAL TAKE-OFF AIRCRAFT
Philip Charles Ruffles and Paul Alfred Taylor, Derby, England, assignors to Rolls-Royce Limited, Derbyshire, England, a British company
Filed Feb. 23, 1967, Ser. No. 617,894
Claims priority, application Great Britain, Mar. 11, 1966, 10,943/66
4 Claims. (Cl. 244—54)

ABSTRACT OF THE DISCLOSURE

Aircraft having lift engines in ducts, each engine having a vaned rotor through which the turbine exhaust gases flow and which causes the latter to induce swirl in the air flowing through the duct, whereby to augment thrust.

---

This invention concerns an aircraft adapted for vertical take off and landing.

According to the present invention, there is provided an aircraft which is adapted for vertical take off and landing and which is provided with a plurality of gas turbine vertical lift engines each of which is vertically mounted in a duct and is provided with a vaned rotor through which in operation flow the turbine exhaust gases of the engine, the vaned rotor of each vertical lift engine in operation causing the turbine exhaust gases to emerge therefrom in such a way as to induce swirl in, and thus increase the entrainment of, ambient air flowing through the respective duct, the vertical lift engines being movable between an inoperative position in which they are stowed away within the aircraft structure and in which an outer wall of each said duct merges into the aircraft structure, and an operative position in which the vertical lift engines and the outer walls of their ducts are disposed outwardly of the aircraft structure.

The term "vertical lift engine" as used in this specification is intended to indicate an engine arranged to produce vertical lift forces on the aircraft independently of those generated aerodynamically by forward flight of the aircraft. For this purpose the thrust to weight ratio of the engine should desirably be at least 12:1 and may be 20:1 or even more.

The vertical lift engines are preferably vertically mounted in bays which are respectively disposed on opposite longitudinal sides of the aircraft fuselage, each bay having an outer wall which, in the said inoperative position, merges into that of the fuselage and, in the said operative position, the outer wall of the bay, which forms the outer wall of the duct, is disposed outwardly of the fuselage.

The outer wall of each bay may be connected to the fuselage by side walls having portions which are respectively pivotally connected to the fuselage, the outer wall and each other, the said portions being collinear in the said operative position, and collapsed against each other in the said inoperative position, the vertical lift engines being mounted by being pivotally connected to struts which are themselves pivotally connected to the fuselage and respective outer wall.

The said bays may be provided with inflatable members which, when inflated, form convergent-divergent ducts through which ambient air may flow past the vertical lift engines.

Figure 3:
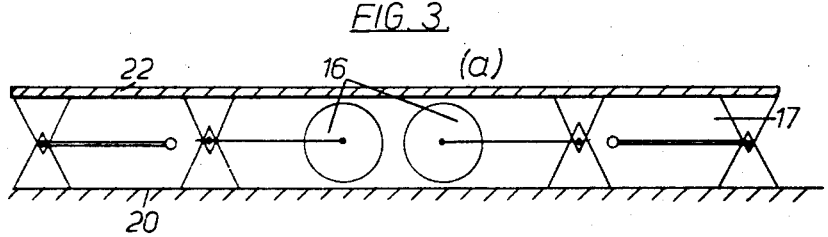
Figure 4:
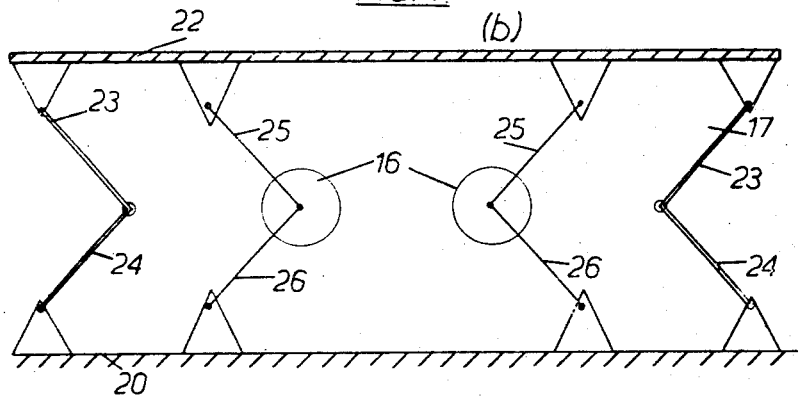
Figure 5:
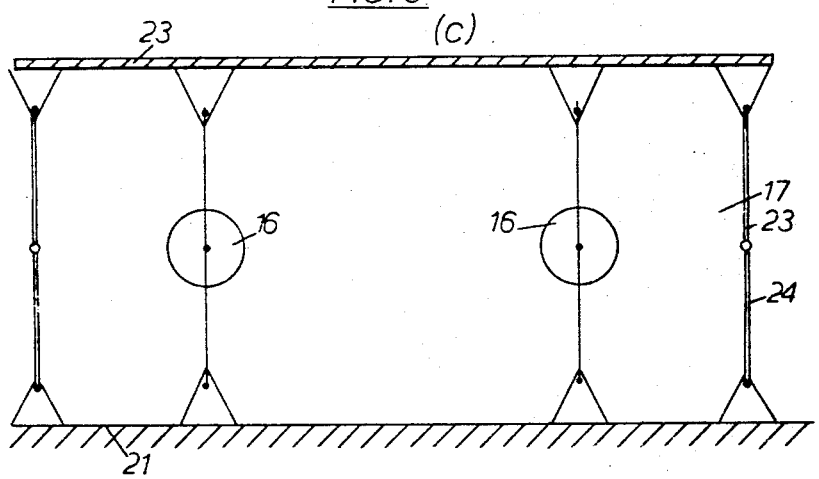

The invention is illustrated, merely by way of example, in the accompanying drawings, in which:

FIGURE 1 is a diagrammatic plan view of an aircraft in accordance with the present invention, FIGURE 2 is a diagrammatic elevation of the aircraft of FIGURE 1 showing one of the vertical lift engines thereof in an inoperative position and another of the vertical lift engines thereof in an operative position, FIGURES 3–5 are diagrammatic plan views of an engine bay of the aircraft of FIGURE 1, FIGURES 3 and 5 respectively showing the respective positions of the outer wall of the bay in the said inoperative and operative positions, and FIGURE 4 showing the position of the said outer wall in a mid position, and FIGURE 6 is a sectional view of a vertical lift engine disposed in a said bay.

Referring to the drawings, an aircraft 10 which is adapted for vertical take off and landing has a fuselage 11, wings 12 and tail plane 13. The fuselage 11 has an upper portion 14 for carrying passengers and/or freight and a lower portion 15 for carrying baggage and/or freight.

The aircraft 10 is provided with forward propulsion gas turbine engines (not shown). The aircraft 10 is additionally provided with eight gas turbine vertical lift engines 16 which are arranged in pairs, each pair of vertical lift engines 16 being mounted in a bay 17. Two of the bays 17 are disposed on opposite longitudinal sides of the fuselage 11 forwardly of the wings 12, while the remaining two bays 17 are disposed on opposite longitudinal sides of the fuselage 11 rearwardly of the wings 12.

The fuselage 11 has an outer wall 19, each of the bays 17 having an inner wall 20 which is constituted by a wall of the fuselage 11 disposed inwardly of the said outer wall 19.

Each of the bays 17 has an outer wall 22 which is movable (by means not shown) into and out of an inoperative, or "cruise," position (shown in the "upper" part of FIGURE 1, on the left hand side of FIGURE 2, and in FIGURE 3), in which it merges into the outer wall 19 of the fuselage. The outer wall 22 however, is also movable (by means not shown) into and out of an operative (or V.T.O.L) position (shown in FIGURE 5, in the "lower" part of FIGURE 1, and on the right hand side of FIGURE 2) in which it is disposed outwardly of the outer wall 19 of the fuselage 11.

In the said inoperative position, the pair of vertical lift engines 16 in each bay 17 are disposed closely adjacent to each other and are stowed away within the fuselage 11. In the said operative position, however, the two vertical lift engines 16 in each bay 17 are spaced apart from each other longitudinally of the aircraft, and are wholly disposed outwardly of the fuselage 11.

The outer wall 22 of each bay 17 is connected to the wall 20 of the fuselage 11 by side walls having portions 23, 24 which are pivotally connected to each other. The portions 23 are pivotally connected to the outer wall 22, while the portions 24 are pivotally connected to the wall 20. The side wall portions 23, 24 may thus be moved progressively between the positions shown in FIGURES 3–5. In the FIGURE 3 position, the portions 23, 24 are collapsed against each other, while in the FIGURE 5 position, the portions 23, 24 are collinear.

The vertical lift engines 16 are mounted in their bays 17 by being pivotally connected to struts 25, 26 which are themselves pivotally connected to the outer wall 22 and the wall 20 respectively.

The walls 20, 22 are respectively provided with inflatable members 30, 31 (FIGURE 2) which are deflated in the said inoperative position and which are inflated in the said operative position (by means not shown). When inflated, the members 30, 31 form convergent-divergent ducts through which ambient air may flow past the vertical lift engines 16.

As shown in FIGURE 6, each of the vertical lift engines 16 is provided with a vaned rotor 32 which is mounted downstream of the turbine or turbines (not shown) of the respective vertical lift engine 16. The turbine exhaust gases of each engine 16 flow between the vanes 33 of the rotor 32, the vanes 33 causing the turbine exhaust gases to induce swirl in the ambient air passing through the respective bay 17 whereby to increase the entrainment of ambient air through the bay. This increases the mass flow produced by the engines and thus augments thrust.

It will be noted that the rotor 32 of each vertical lift engine 16 does not extend radially outwardly of its vertical lift engine. Thus it increases the thrust of its vertical lift engine without making it more difficult to stow the latter away during cruising conditions, and without causing the vertical lift engine to have a larger frontal area or appreciably increased weight at that time.

It will be appreciated that this would not, for example, be the case if, in contrast to the present invention, the rotors 32 were dispensed with and the vertical lift engines 16 were provided with fan blades rotating in the shroud provided by the members 30, 31, since such fan blades cannot be readily collapsed during cruising and thus significantly increase frontal area and installed volume.

We claim:

1. An aircraft which is adapted for vertical take off and landing and which has a plurality of ducts, a gas turbine vertical lift engine vertically mounted in each said duct, a vaned rotor for each engine through which in operation flow the turbine exhaust gases of the engine, the vaned rotor of each vertical lift engine in operation causing the turbine exhaust gases to emerge therefrom to induce swirl in, and thus increase the entrainment of, ambient air flowing through the respective duct, and means for moving the vertical lift engines between an inoperative position in which they are stowed away within the aircraft structure and in which an outer wall of each said duct merges into the aircraft structure, and an operative position in which the vertical lift engines and the outer walls of their ducts are disposed outwardly of the aircraft structure.

2. An aircraft as claimed in claim 1 in which the vertical lift engines are vertically mounted in bays which are respectively disposed on opposite longitudinal sides of the aircraft fuselage, each bay having an outer wall which, in the said inoperative position merges into that of the fuselage and, in the said operative position, the outer wall of the bay, which forms the outer wall of the duct, is disposed outwardly of the fuselage.

3. An aircraft as claimed in claim 2 in which the outer wall of each bay is connected to the fuselage by side walls having portions which are respectively pivotally connected to the fuselage, the outer wall and each other, the said portions being collinear in the said operative position, and collapsed against each other in the said inoperative position, and struts to which the vertical lift engines are pivotally connected and which are themselves pivotally connected to the fuselage and respective outer wall.

4. An aircraft as claimed in claim 2 in which the said bays are provided with inflatable members which, when inflated, form convergent-divergent ducts through which ambient air may flow past the vertical lift engines.

References Cited

UNITED STATES PATENTS

| 2,944,624 | 7/1960 | Morley | 239—265.11 X |
| 3,201,067 | 12/1965 | Meyerhoff | 244—23 |
| 3,285,003 | 11/1966 | Martin et al. | 244—23 X |
| 3,302,907 | 2/1967 | Wilde et al. | 244—54 X |
| 3,081,949 | 3/1963 | Simmons | 239—383 |
| 3,084,888 | 4/1963 | Hertel | 244—23 |

MILTON BUCHLEY, *Primary Examiner.*

J. PITTENGER, *Assistant Examiner.*

U.S. Cl. X.R.

239—265.11, 383; 60—263